United States Patent
Fattal

(10) Patent No.: US 10,802,212 B2
(45) Date of Patent: *Oct. 13, 2020

(54) ANGULAR SUBPIXEL RENDERING MULTIVIEW DISPLAY USING SHIFTED MULTIBEAM ELEMENTS

(71) Applicant: LEIA INC., Menlo Park, CA (US)

(72) Inventor: David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 276 days.

This patent is subject to a terminal disclaimer.

(21) Appl. No.: 15/911,938

(22) Filed: Mar. 5, 2018

(65) Prior Publication Data

US 2018/0196194 A1 Jul. 12, 2018

Related U.S. Application Data

(63) Continuation of application No. PCT/US2016/050451, filed on Sep. 6, 2016, and a
(Continued)

(51) Int. Cl.
*G02B 6/12* (2006.01)
*F21V 8/00* (2006.01)
(Continued)

(52) U.S. Cl.
CPC .............. *G02B 6/12* (2013.01); *G02B 6/006* (2013.01); *G02B 6/0036* (2013.01);
(Continued)

(58) Field of Classification Search
CPC .. G02F 1/1335; G02F 1/133504; G09F 19/12; G09F 9/30; G03H 1/2205;
(Continued)

(56) References Cited

U.S. PATENT DOCUMENTS 9,063,382 B2 6/2015 Kim
9,201,270 B2 12/2015 Fattal et al.
(Continued)

FOREIGN PATENT DOCUMENTS

| JP | 2010243941 A | 10/2010 | |
|---|---|---|---|
| WO | 2015016844 A1 | 3/2013 | |
| WO | WO-2015016844 A1 * | 2/2015 | ....... G02F 1/133615 |

OTHER PUBLICATIONS

International Search Report (ISR), 3 pages, from KIPO (ISA/KR), dated Jan. 16, 2017, for counterpart parent PCT patent application No. PCT/US2016/050451.
(Continued)

*Primary Examiner* — Sath V Perungavoor
*Assistant Examiner* — Tyler B Edwards
(74) *Attorney, Agent, or Firm* — J. Michael Johnson

(57) ABSTRACT

Multiview displays include a backlight and a screen used to form a plurality of multiview pixels. Each multiview pixel includes a plurality of sets of light valves. The backlight includes a light source optically coupled to a plate light guide configured with a plurality of multibeam elements. Each multibeam element corresponds to a set of light valves and is spatially offset with respect to a center of the set of light valves toward a center of the multiview pixel. The plurality of multibeam elements are also configured to couple out light from the plate light guide with different angles and angular offsets such that at least a portion of the coupled-out light beams interleave and propagate in different view directions of the multiview display.

20 Claims, 14 Drawing Sheets

Related U.S. Application Data continuation of application No. PCT/US2016/050334, filed on Sep. 5, 2016, application No. 15/911,938, which is a continuation of application No. PCT/US2016/040584, filed on Jun. 30, 2016, application No. 15/911,938, which is a continuation of application No. PCT/US2016/036495, filed on Jun. 8, 2016.

(60) Provisional application No. 62/340,505, filed on May 23, 2016, provisional application No. 62/289,237, filed on Jan. 30, 2016, provisional application No. 62/214,970, filed on Sep. 5, 2015.

(51) Int. Cl.
*G02B 27/42* (2006.01)
*G02F 1/1335* (2006.01)
*G09F 9/30* (2006.01)
*G09F 19/12* (2006.01)

(52) U.S. Cl.
CPC .......... *G02B 6/0058* (2013.01); *G02B 27/42* (2013.01); *G02F 1/1335* (2013.01); *G09F 9/30* (2013.01); *G09F 19/12* (2013.01)

(58) Field of Classification Search
CPC .......... G03H 1/265; G03H 2001/2207; G03H 2001/2231; G03H 2001/2234; G03H 2001/2242; G03H 2223/23; H04N 13/307; H04N 13/351
See application file for complete search history.

(56) References Cited

U.S. PATENT DOCUMENTS

| | | |
|---|---|---|
| 9,298,168 B2 | 3/2016 | Taff et al. |
| 9,389,415 B2 | 7/2016 | Fattal et al. |
| 9,459,461 B2 | 10/2016 | Santori et al. |
| 9,557,466 B2 | 1/2017 | Fattal |
| 2002/0141056 A1* | 10/2002 | Kobayashi ............ H04N 13/32 359/462 |
| 2003/0058209 A1 | 3/2003 | Balogh |
| 2008/0150936 A1* | 6/2008 | Karman ............... H04N 13/376 345/419 |
| 2012/0038986 A1 | 2/2012 | Pesach |
| 2013/0169694 A1 | 7/2013 | Chen et al. |
| 2015/0016777 A1 | 1/2015 | Abovitz et al. |
| 2015/0036068 A1 | 2/2015 | Fattal et al. |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

* cited by examiner

ANGULAR SUBPIXEL RENDERING MULTIVIEW DISPLAY USING SHIFTED MULTIBEAM ELEMENTS

CROSS-REFERENCE TO RELATED APPLICATIONS

This application is a continuation application of and claims the benefit of priority to International Application No. PCT/US2016/050451, filed Sep. 6, 2016, and further to International Application No. PCT/US2016/036495, filed Jun. 8, 2016, which claims priority to U.S. Provisional Patent Application Ser. No. 62/289,237, filed Jan. 30, 2016, International (PCT) Application No. PCT/US2016/040584, filed Jun. 30, 2016, which claims priority to U.S. Provisional Patent Application Ser. No. 62/340,505, filed May 23, 2016, and International (PCT) Application No. PCT/US2016/050334, filed Sep. 5, 2016, which claims priority to U.S. Provisional Patent Application Ser. No. 62/214,970, filed Sep. 5, 2015, all of which are incorporated by reference herein in their entireties.

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various other displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

In order to overcome the limitations of passive displays associated with emitted light, many passive displays are coupled to an external light source. The coupled light source may allow these otherwise passive displays to emit light and function substantially as an active display. Examples of such coupled light sources are backlights. A backlight may serve as a source of light (often a panel backlight) that is placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

DESCRIPTION OF THE DRAWINGS

Various features of examples and embodiments in accordance with the principles described herein may be more readily understood with reference to the following detailed description taken in conjunction with various examples illustrated in the accompanying drawings, where like reference numerals designate like structural elements, and in which.

Figure 1A:
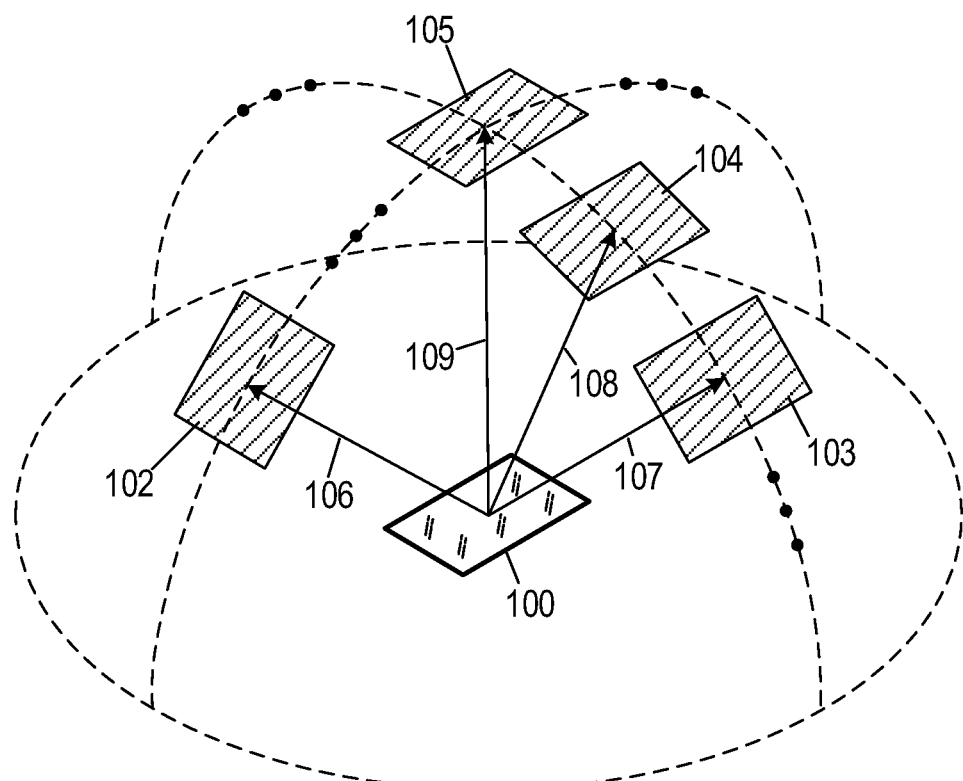
FIG. 1A illustrates a perspective view of a multiview image produced by an example multiview display.

Certain examples and embodiments may have other features that are one of in addition to and in lieu of the features illustrated in the above-referenced figures. These and other features are described below with reference to the above-referenced figures.

DETAILED DESCRIPTION

Examples and embodiments in accordance with the principles described herein provide angular subpixel rendering in a multiview display using shifted multibeam elements. As described herein, a multiview display is an electronic display or display system configured to provide a plurality of different views of a multiview image in different view directions. In particular, the term 'multiview' as used in the terms 'multiview image' refers to a plurality or a number of different views representing different perspective views or including angular disparity between views of the many different views. In addition, the term 'multiview' includes more than two different views (i.e., a minimum of three views and generally more than three views). As such, a 'multiview display' is distinguished from a stereoscopic display, which only provides or displays two different views to represent a scene or an image. Note however, while multiview images and multiview displays include more than two views, multiview images may be viewed (e.g., on a multiview display) as a stereoscopic pair of images by selecting only two of the multiview views to view at a time (e.g., one view per eye).

According to various embodiments, a multiview display comprises a screen with a plurality of multiview pixels. Each multiview pixel comprises a plurality of sets of light valves. Further, the multiview display includes a backlight that comprises a light source optically coupled to a plate light guide that is configured with a plurality of multibeam elements. Each multibeam element corresponds to a set of light valves, and the size of each multibeam element is comparable to the size of a light valve of the set of light valves. The term 'size' used to describe the multibeam elements and the light valve may be a length, width, or area, for example. In addition, each multibeam element is spatially offset, or equivalently has a spatial offset, with respect to a center of a corresponding set of light valves. In particular, the multibeam elements may be spatially offset generally toward a center of the multiview pixel. In some embodiments, a shape of the multibeam element is analogous to a shape of the multiview pixel.

In various embodiments, the sets of light valves of the multiview pixels modulate the light coupled out of backlight by the corresponding multibeam elements. The spatial offset of the multibeam elements creates an angular offset in modulated light beams emerging from the sets of light valves. As a result of the angular offset, the modulated light beams that emerge from the sets of light valves associated with each multiview pixel interleave to create multiview images at a viewing distance from the screen. According to various embodiments of the principles described herein, the multiview display having interleaved modulated light beams may provide a multiview image having a resolution that is perceived to be higher than a 'native' resolution of the multiview display, i.e., a resolution that is higher than a resolution of the multiview display without interleaved light beams. In particular, a perceived higher than native resolution may be a result of angular subpixel rendering associated with the interleaved modulated light beams provided by the multiview display, according to various embodiments.

Figure 9A:
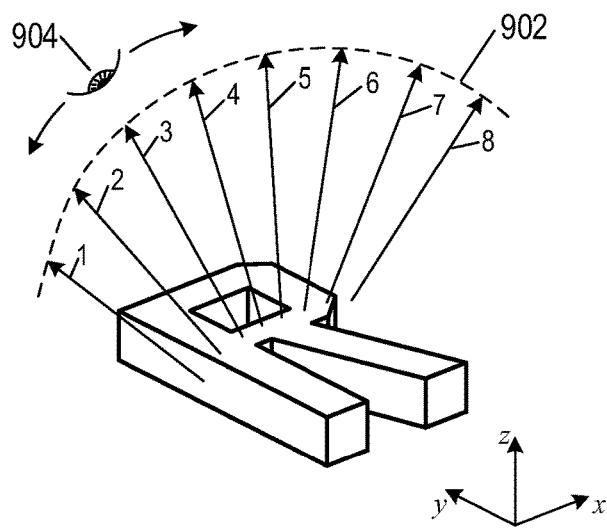
FIG. 9A illustrates the letter "R" as an example of a three-dimensional (3D) object.

FIG. 1A illustrates a perspective view of a multiview image produced by an example multiview display 100. As illustrated in FIG. 1A, the multiview display 100 may simultaneously display multiple images. Each image provides a different view of a scene or object from a different view direction or perspective. In FIG. 1A, the view directions are illustrated as arrows extending from the multiview display 100 in various different principal angular directions. The different views are illustrated as shaded polygonal panels at the termination of the arrows. For example, in FIG. 1A, four polygonal panels 102-105 represent four different views of a multiview image from different corresponding view directions 106-109. Suppose the multiview display 100 is used to display a multiview image of an object (e.g., a three-dimensional letter 'It', as illustrated below with respect to FIGS. 9A-9B). When an observer views the multiview display 100 in the direction 106, the observer sees the view 102 of the object. However, when the observer views the multiview display 100 from the view direction 109, the observer sees a different view 105 of the same object. Note that for simplicity of illustration the different views are illustrated in FIG. 1A as being above the multiview display 100. In practice, the different views are actually simultaneously displayed on a screen of the multiview display 100, enabling an observer to view an object or scene from different view directions by simply changing the observer's view direction of the multiview display 100.

A view direction or equivalently a light beam having a direction corresponding to a view direction of a multiview display generally has a principal angular direction given by angular components ($\alpha$, $\beta$). The angular component $\alpha$ is referred to as the 'elevation component' or 'elevation angle' of the light beam. The angular component $\beta$ is referred to as the 'azimuth component' or 'azimuth angle' of the light beam. The elevation angle $\alpha$ is an angle in a vertical plane (e.g., perpendicular to a plane of the screen of the multiview display) while the azimuth angle $\beta$ is an angle in a horizontal plane (e.g., parallel to the plane of the screen of the multiview display).

Figure 1B:
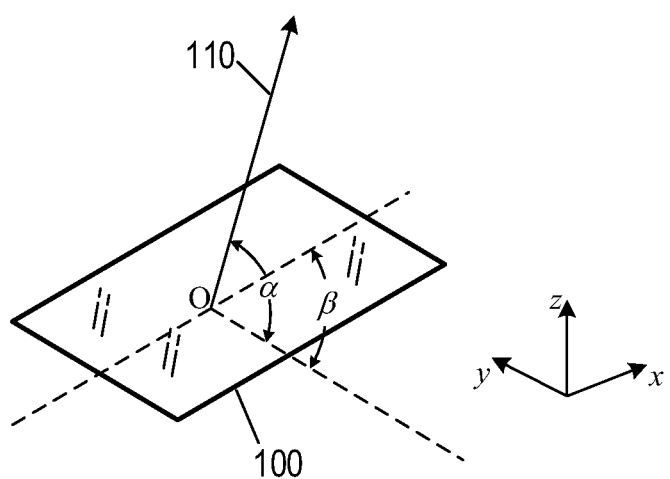
FIG. 1B illustrates a graphical representation of angular components of a light beam emanating from a multiview display.

FIG. 1B illustrates a graphical representation of the angular components ($\alpha$, $\beta$) of a light beam 110 emitted or emanating from a point on the multiview display 100 with a particular principal angular direction corresponding to a view direction, such as the view direction 108 in FIG. 1A, for example. The light beam 110 has a central ray associated with a particular point of origin "O" within the multiview display 100.

Figure 2A:
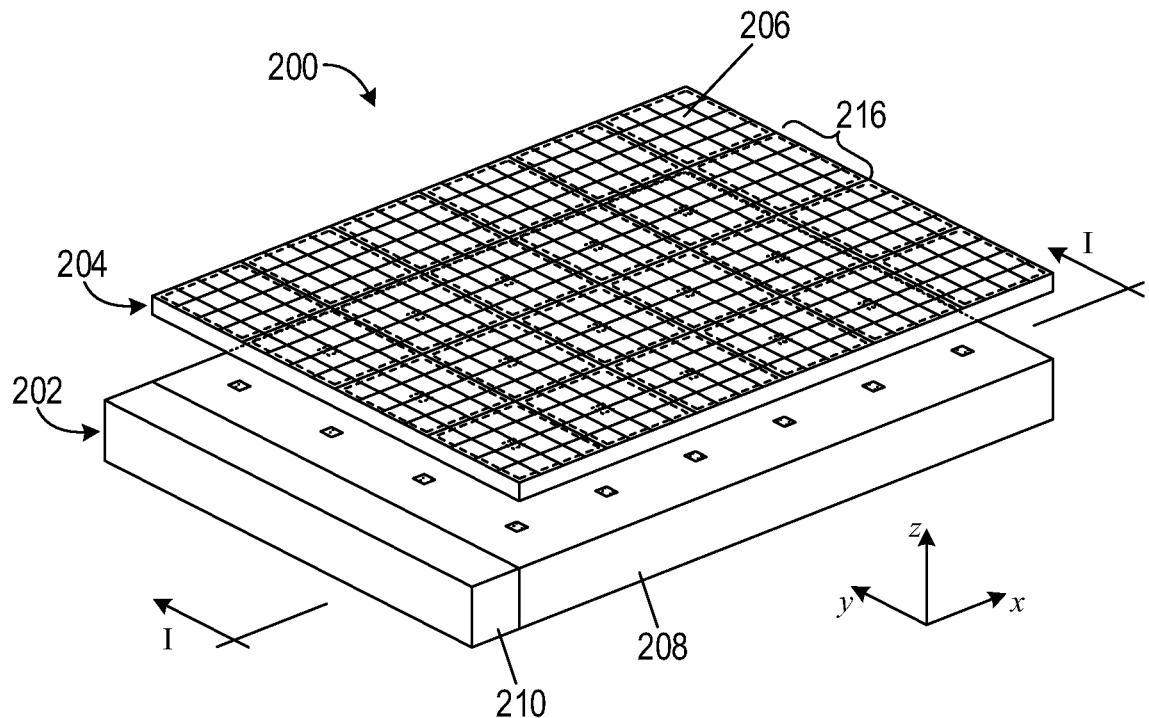
FIG. 2A illustrates an isometric view of an example multiview display.
Figure 2B:
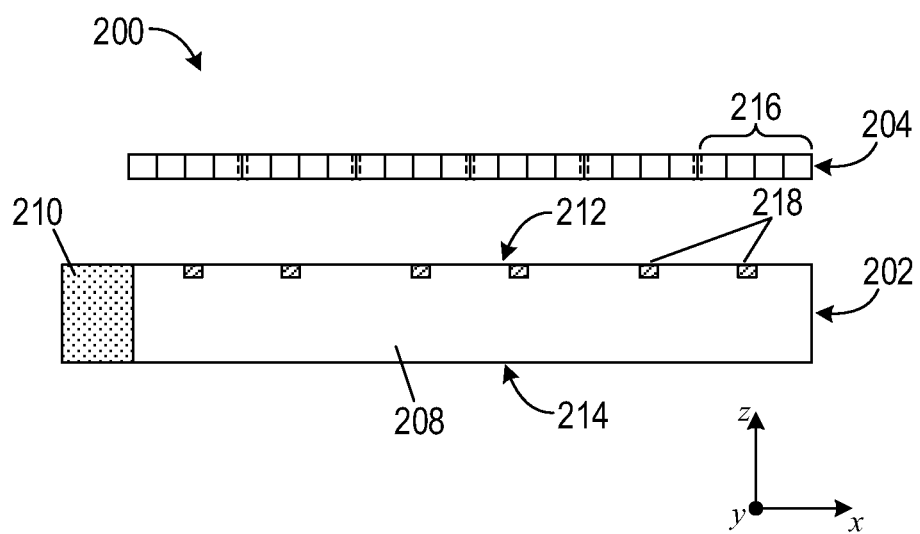
FIG. 2B illustrates a cross-sectional view of the multiview display illustrated in FIG. 2A along a line I-I.
Figure 2C:
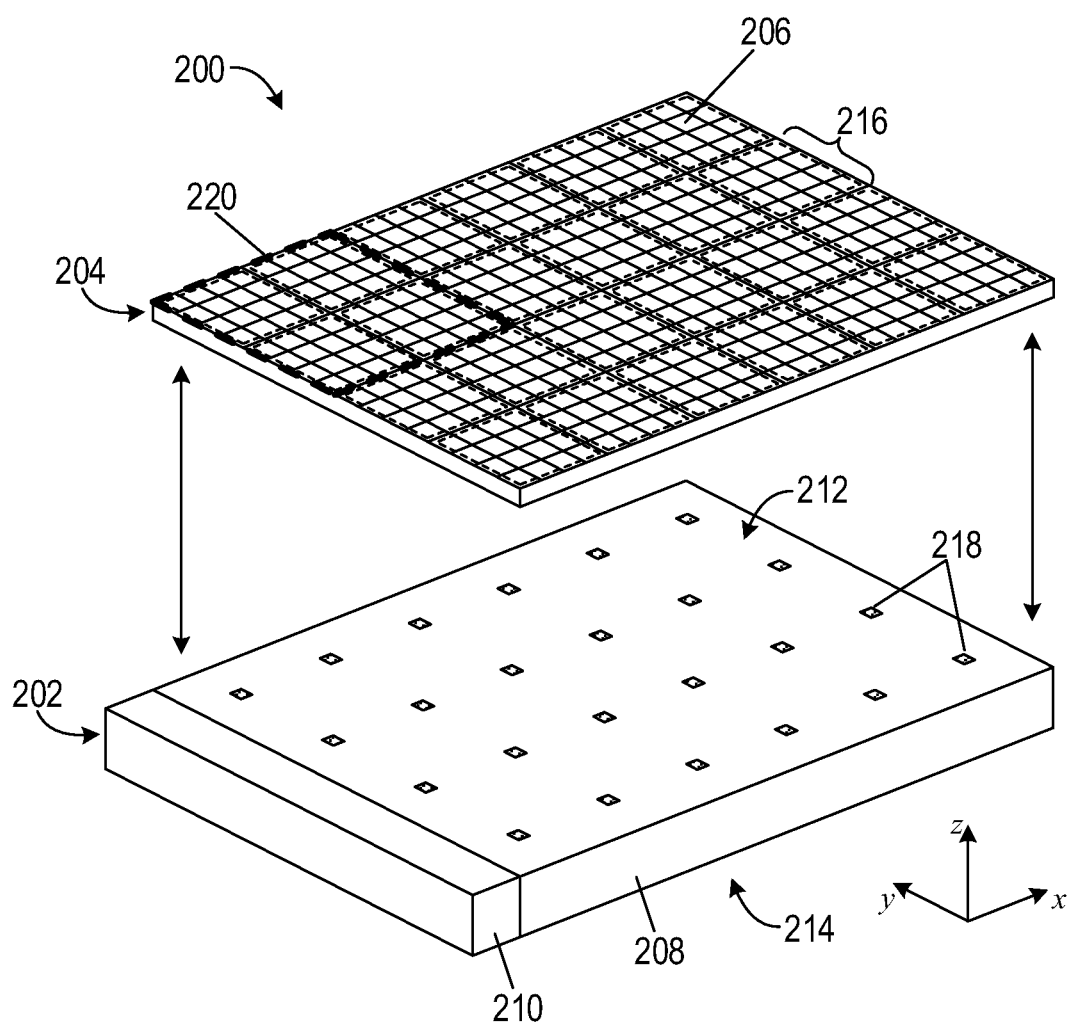
FIG. 2C illustrates an exploded isometric view of the multiview display illustrated in FIG. 2A.

FIG. 2A illustrates an isometric view of an example multiview display 200. FIG. 2B illustrates a cross-sectional view of the multiview display 200 along a line I-I in FIG. 2A. FIG. 2C illustrates an exploded isometric view of the multiview display 200. As illustrated in FIGS. 2A-2C, the multiview display 200 comprises a backlight 202 and a screen 204 that, in turn, comprises an array of light valves. Light valves in the array of light valves are represented by squares, as illustrated. For example, a light valve is represented by square 206. The backlight 202 comprises a plate light guide 208 and a light source 210 optically coupled to an edge of the plate light guide 208. Light generated by the light source 210 is coupled into the plate light guide 208 along an edge of the plate light guide 208 adjacent to the light source 210, according to various embodiments.

The plate light guide 208 may be a plate or slab optical waveguide having substantially planar, parallel first and second surfaces 212 and 214, respectively. The plate light guide 208 may comprise any one of a number of different optically transparent materials or comprise any of a variety of dielectric materials including, but not limited to, one or more of various types of glass, such as silica glass, alkali-aluminosilicate glass, borosilicate glass, and substantially optically transparent plastics or polymers, such as poly (methyl methacrylate) or acrylic glass, and polycarbonate. In some embodiments, the plate light guide 208 may include a cladding layer on at least a portion of a surface of the plate light guide 208 (not illustrated) to further facilitate total internal reflection (TIR).

The light source 210 may comprise one or more optical emitters. An optical emitter may be a light-emitting diode (LED), a laser, an organic light-emitting diode (OLED), a polymer light-emitting diode, a plasma-based optical emitter, a fluorescent lamp, an incandescent lamp, and any other source of light. The light produced by the light source 210 may be of a particular wavelength (i.e., may be of a particular color), or may be over or include a range of wavelengths (e.g., white light). In some embodiments, the light source 210 may include sets of optical emitters in which each set of optical emitters produces light of a particular wavelength or a range of wavelengths that is different from the wavelength or range of wavelengths produced by the other sets of optical emitters. For example, the light source 210 may comprise sets of optical emitters in which each set of one or more optical emitters produces one of the primary colors (e.g., red, green, and blue).

As illustrated in FIGS. 2A-2C, the array of light valves are partitioned into sets of light valves demarcated by dashed-line squares. In the example of FIGS. 2A-2C, each set of light valves comprises a four-by-four sub-array of sixteen light valves. For example, a set of light valves 216 comprises a four-by-four array of light valves demarcated by a dashed-line square. Each set of light valves corresponds to a multibeam element 218 of the plate light guide 208. In the example of FIGS. 2A-2C, the multibeam elements 218 are represented by shaded square-shaped patches on the first surface 212 of the plate light guide 208. According to various embodiments, a size of each multibeam element 218 is comparable to the size of a light valve 206. For example, the size of a multibeam element 218 may be between about one-half and about two times the size of the light valve 206, e.g., see equation (2) below.

Note that although examples and embodiments of multi-view displays are illustrated and described herein with reference to sets of light valves comprising four-by-four sub-arrays of light valves (i.e., sub-array of sixteen light valves), as illustrated in FIGS. 2A-2C, the number of light valves used to form sets of light valves may by N-by-N sub-arrays of light valves, where N is an integer greater than or equal to two. Sets of light valves may also be rectangular N-by-M sub-arrays of light valves, where N is an integer greater than or equal to two and M is an integer greater than or equal to zero.

Sets of light valves may be grouped to form multiview pixels of an array of multiview pixels. A 'multiview pixel' is a plurality of sets of light valves representing 'view' pixels in each of a similar plurality of different views of a multi-view display. In particular, a multiview pixel may have a plurality of sets of light valves corresponding to or representing a view pixel in each of the different views of a multiview image. Moreover, the sets of light valves of the multiview pixel are so-called 'directional pixels' in that each of the sets of light valves is associated with a predetermined view direction of a corresponding one of the different views. Further, according to various examples and embodiments, the different view pixels represented by the sets of light valves of a multiview pixel may have equivalent or at least substantially similar locations or coordinates in each of the different views. For example, the twenty-four sets of light valves of the screen 204 illustrated in FIGS. 2A and 2C may be grouped to form an array of six multiview pixels, each multiview pixel comprising a two-by-two array of four sets of light valves. In FIG. 2C, an example multiview pixel comprising a two-by-two array of four sets of light valves is outlined by dashed-line square 220. In certain embodiments, multiview pixels of an array of multiview pixels may be formed from or include three-by-three arrays of nine sets of light valves, four-by-four arrays of sixteen sets of light valves, and five-by-five arrays of twenty-five sets of light valves. In other embodiments, the multiview pixels of an array of multiview pixels may be formed from or include rectangular arrays of sets of light valves. In general, multi-view pixels of an array of multiview pixels may be formed from or include K-by-L arrays of K×L sets of light valves, where K is an integer greater than or equal to 2 and L is an integer greater than or equal to one.

Figure 3:
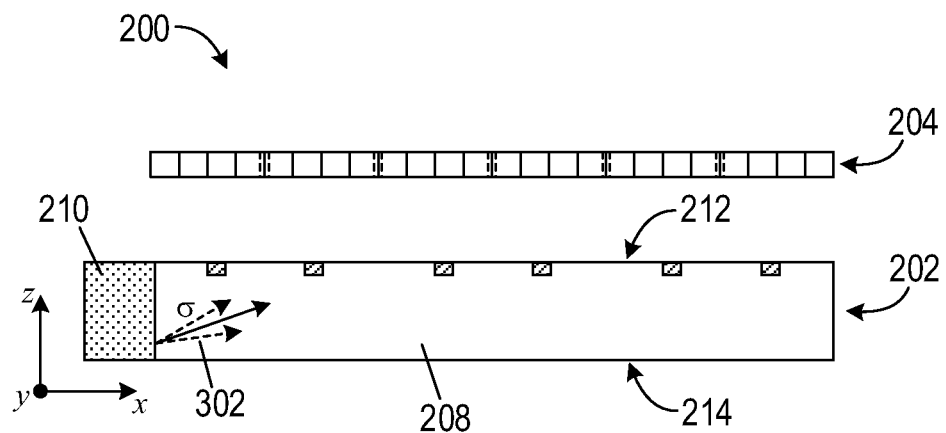
FIG. 3 illustrates a cross-sectional view of the multiview display illustrated in FIG. 2B with light coupled into a plate light guide of the multiview display.

FIG. 3 illustrates a cross-sectional view of the multiview display 200 in which light 302 provided by the light source 210 is input to, or coupled into, the plate light guide 208. The light 302 is couple into the plate light guide 208 at a non-zero propagation angle (e.g., about 30-35 degrees) with respect to the first and second surfaces 212 and 214 of the plate light guide 208. The multiview display 200 may include one or more lenses, mirrors or similar reflectors (e.g., a tilted collimating reflector), and one or more prisms (not illustrated) may be used to couple light provided by the light source 210 into the plate light guide 208 at the non-zero propagation angle. The light 302 may be input to or couple into the plate light guide 208 as collimated light 302, e.g., as a collimate beam of light 302. A degree to which the light 302 is collimated within the collimated light beam is represented by a collimation factor denoted by $\sigma$. The collimation factor defines an angular spread of light rays within the collimated light beam. For example, a collimation factors may specify that a majority of light rays in the collimated beam of collimated light 302 is within a particular angular spread (e.g., $+/-\sigma$ degrees) about a central or principal angular direction of the collimated beam of guide light). The light rays of the collimated light 302 may have a Gaussian distribution in terms of angle and the angular spread may be an angle determined by at one-half of a peak intensity of the collimated light beam.

Figure 4:
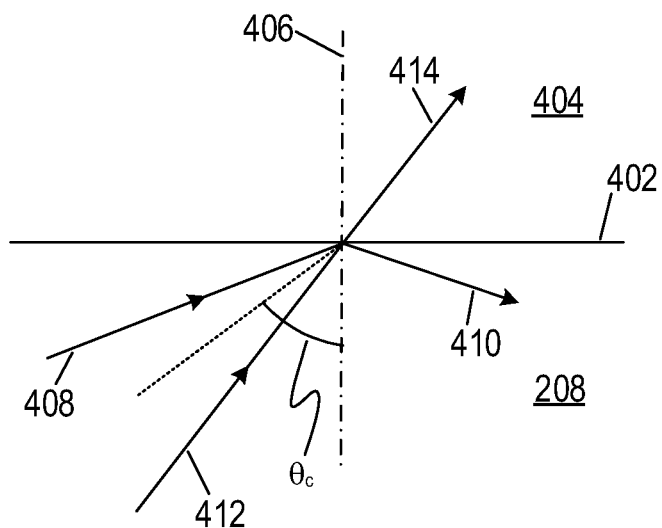
FIG. 4 illustrates an example of total internal reflection.

The plate light guide 208 is configured to guide the light 302 according to TIR at the non-zero propagation angle between the first surface 212 and the second surface 214 of the plate light guide 208. FIG. 4 illustrates trajectories of two beams of light that may propagate within the plate light guide 208 and are incident on the same point of a surface 402 (e.g., the surface 402 may be the first surface 212 or the second surface 214) of the plate light guide 208. As illustrated, the surface 402 is a boundary between the plate light guide 208 and air (or another material) 404, which has a lower refractive index than the plate light guide 208. Dot-dash line 406 represents a normal direction to the surface 402 and $\theta_c$ denotes a critical angle with respect to the normal direction 406. The angle of incidence is measured with respect to the normal direction 406. The light incident on the surface 402 at angles greater than the critical angle $\theta_c$ experiences TIR. For example, because the light represented by directional arrow 408 is incident on the surface 402 at an angle greater than the critical angle $\theta_c$, the light is internally reflected by TIR as represented by directional arrow 410. Light incident on the surface 402 at an angle less than the critical angle $\theta_c$, as represented by directional arrow 412, is transmitted through the surface 402 as represented by directional arrow 414.

According to some embodiments, a multibeam element 218 may comprise a diffraction grating configured to diffract incident light. In particular, the multibeam element 218 may comprise a plurality of diffractive features arranged in a periodic or quasi-periodic manner. For example, the multi-beam element 218 may include a plurality of diffractive features (e.g., a plurality of grooves or ridges in a material surface) arranged in a one-dimensional (1D) array. In other examples, the multibeam element 218 may be a two-dimensional (2D) array of diffractive features. The multibeam element 218 may be a 2D array of bumps on, or holes in, a material surface of the plate light guide 208. The multibeam element 218 may be formed or fabricated using any one of many different microfabrication techniques, including, but not limited to, wet etching, ion milling, photolithography, anisotropic etching, and plasma etching, according to various embodiments.

When light is incident on the multibeam element 218 from within the plate light guide 208, the multibeam element 218 comprising the diffraction grating provides transmitted diffraction by diffractively coupling light out from the plate light guide 208 through the multibeam element 218. A multibeam element 218 configured to transmit diffracted light through the multibeam element 218 is referred to as a 'transmission mode' multibeam element, by definition herein. On the other hand, a multibeam element 218 configured to both diffract and reflect incident light (reflected diffraction) is referred to by definition herein as a 'reflection mode' multibeam element. In general, a multibeam element 218 also redirects or changes an angle of the light by or using diffraction (i.e., at a diffractive angle). In particular, diffraction causes the light coupled out by the multibeam element 218 to propagate in different propagation directions from the propagation direction of the light incident on the multibeam element 218 (i.e., incident light). The change in the propagation direction of the light by diffraction is referred to as 'diffractive redirection.' As a result, the multibeam element 218 may be a structure including diffractive features that diffractively redirects light incident on the multibeam element 218 and, if the light propagating within the plate light guide 208 is incident on the multibeam element 218, the multibeam element 218 may also diffractively couple light out from the plate light guide 208. The form of the light diffractively scattered out from the plate light guide 208 by the multibeam element depends on the structure and configuration of the diffractive features.

Figure 5A:
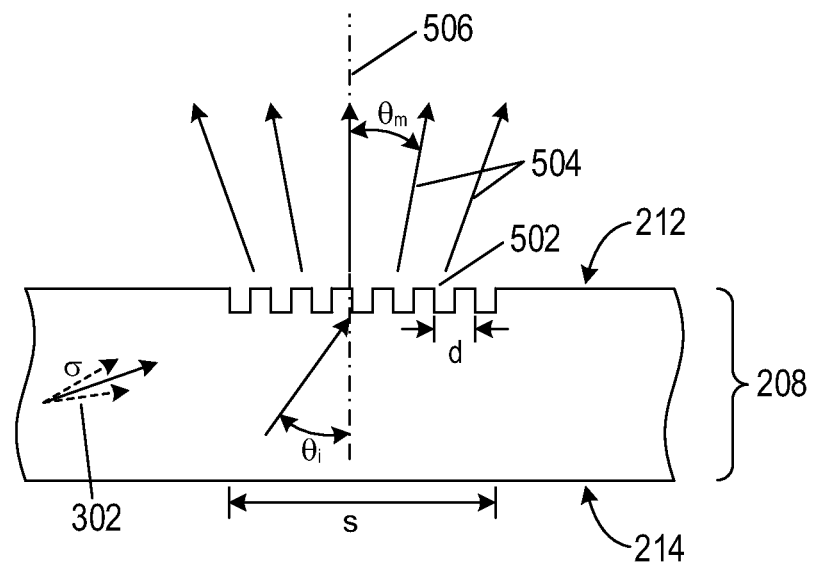
FIGS. 5A-5B illustrate cross-sectional views of examples of transmission mode and reflection mode multibeam elements.

In some embodiments, the multibeam element 218 may comprise a diffraction grating having substantially constant or unvarying diffractive feature spacings throughout the diffraction grating. FIG. 5A illustrates a cross-sectional view a transmission mode multibeam element 502 configured as a diffraction grating with substantially constant or unvarying diffractive feature spacings formed in the first surface 212 of the plate light guide 208. The diffractive feature spacing, d, constant or unvarying across the multibeam element 502. Light incident on the multibeam element 502 is diffractively transmitted or diffractively coupled out of the plate light guide 208 through the multibeam element 502 and the multibeam element 502 is referred to as a 'transmission mode' multibeam element 502. The diffractive feature spacing d may be sub-wavelength (i.e., less than a wavelength of the light). Consider light of a particular wavelength λ interacting with the multibeam element 502. As the light emerges from the multibeam element 502, the light is transmitted and scattered in different directions by the diffractive features, but because waves of light emerge from the multibeam element 502 with different phases, the waves constructively and destructively interfere, creating light beams where the waves constructively interfere. For example, when the path difference between the waves emerging from adjacent diffractive features is half the wavelength (i.e., λ/2), the waves emerge out of phase and may be cancelled through destructive interference. On the other hand, when the path difference between the waves emerging from adjacent diffractive features equals the wavelength λ, the waves constructively interfere creating emerging light beams with maximum intensity. The light that emerges with maximum intensity from the multibeam element 502 are represented in FIG. 5A by directional arrows 504 and the diffraction angles at which each beam of light emerges from the multibeam element 502 with respect to a normal direction 506 to the first surface 212 may be calculated according to the diffraction equation:

$$\theta_m = \sin^{-1}\left(n\sin\theta_i - \frac{m\lambda}{d}\right) \quad (1)$$

where
m is the diffraction order (i.e., m= ..., −2, −1, 0, 1, 2, ...);
n is the refractive index of the plate light guide 208;
$\theta_i$ is the angle of incidence of light with respect to the normal direction 506; and
$\theta_m$ is the diffraction angle with respect to the normal direction 506 of the m-th beam of light diffractively coupled out from the plate light guide 208.

Figure 5B:
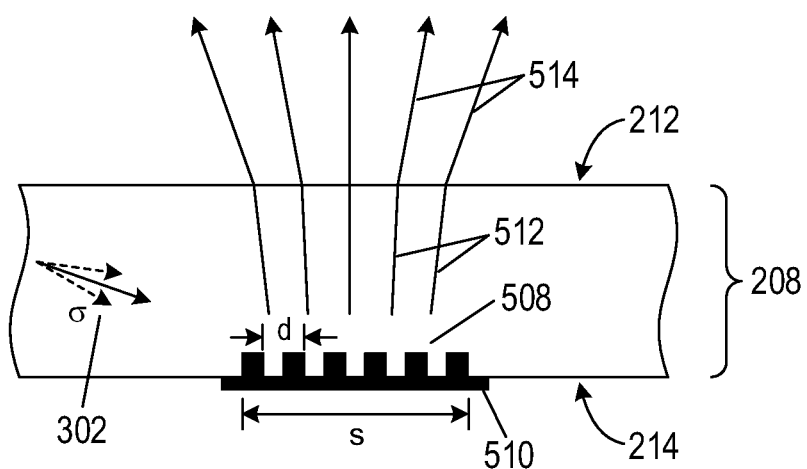

In another example, illustrated in FIG. 5B, a multibeam element 508 may be a diffraction grating formed in the second surface 214 of the plate light guide 208. The multibeam element 508 includes a reflective coating 510, such as silver, aluminum or another reflective material, that fills the diffractive features and grooves of the diffraction grating to create a 'reflection mode' multibeam element 508. The diffraction grating creates diffracted light 512 that is reflected by the reflective coating 510 toward the first surface 212 and emerges as the diffractively coupled-out light 514. The light 514 that emerges from the plate light guide 208 along the first surface 212 is refracted due to the difference between the refractive index of the plate light guide 208 and surrounding air. The diffractive features may be configured to account for refraction. In other embodiments (not illustrated), the multibeam elements 218 may be diffraction gratings located between the first and second surfaces 212 and 214 of the plate light guide 208.

According to some embodiments, the multibeam elements 218 may comprise chirped diffraction gratings. By definition herein, the diffractive feature spacing of a chirped diffraction grating varies across an extent or length of the chirped diffraction grating. In some embodiments, a chirped diffraction grating may have or exhibit a chirp of the diffractive feature spacing that varies linearly with distance. As such, the chirped diffraction grating is a 'linearly chirped' diffraction grating, by definition herein. In other embodiments, the chirped diffraction grating may exhibit a non-linear chirp of the diffractive feature spacing. Various non-linear chirps may be used including, but not limited to, an exponential chirp, a logarithmic chirp or a chirp that varies in another, substantially non-uniform or random but still monotonic manner. Non-monotonic chirps such as, but not limited to, a sinusoidal chirp or a triangle chirp or sawtooth chirp, may also be employed. Combinations of any of non-linear chirps may also be employed.

Figure 5C:
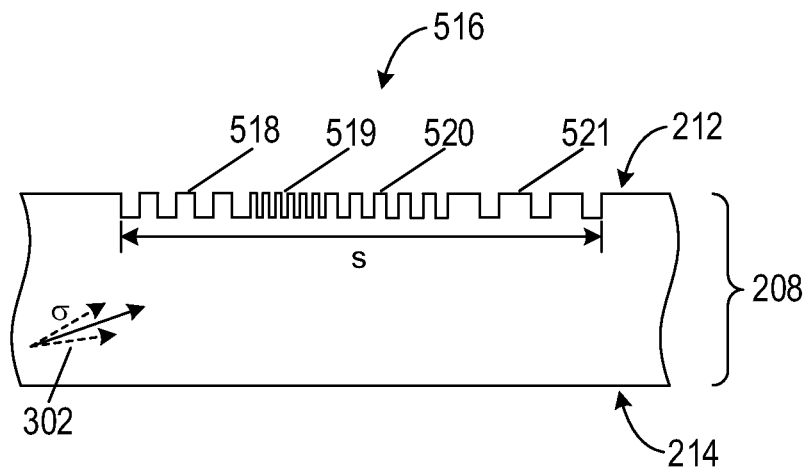
FIGS. 5C-5D illustrate cross-sectional views of examples of transmission mode and reflection mode multibeam elements that include a plurality of diffraction gratings.
Figure 5D:
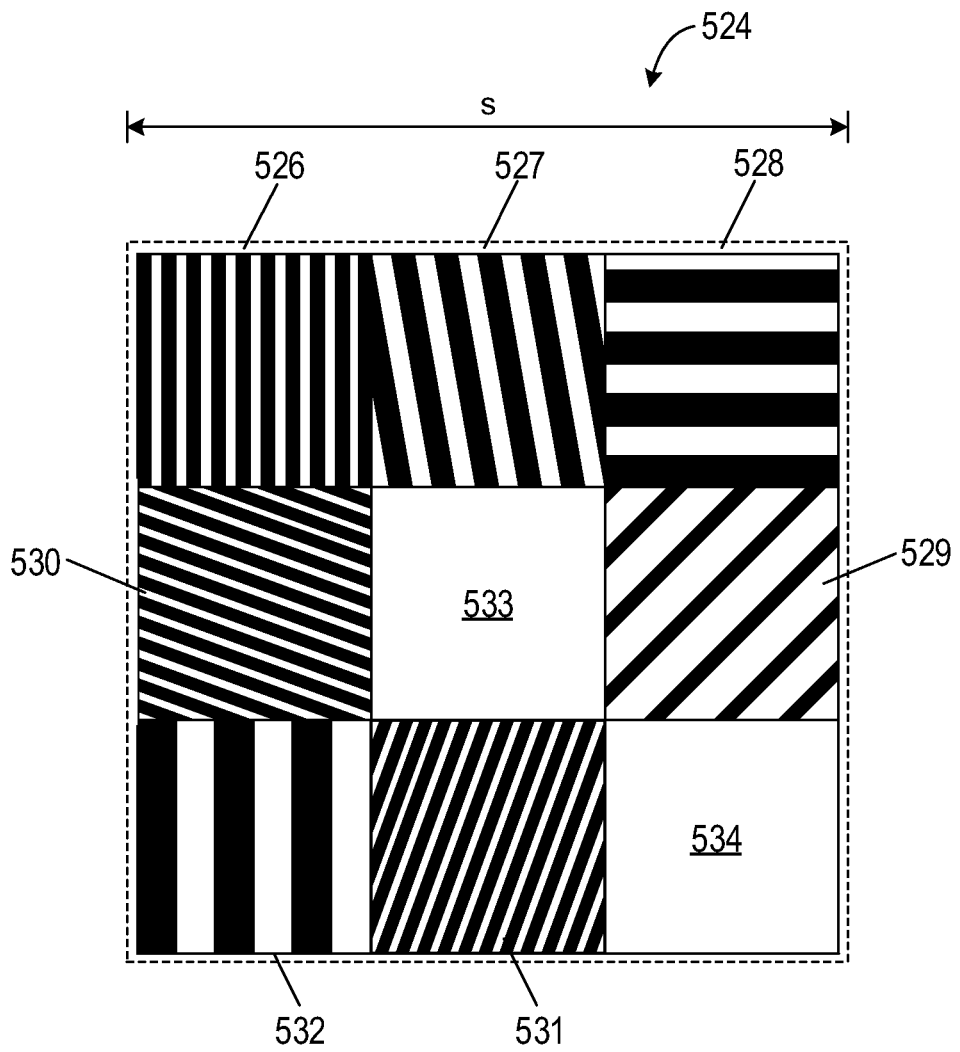

In some embodiments, the multibeam elements 218 may comprise a plurality of diffraction gratings having varying diffractive characteristics. FIG. 5C illustrates a cross sectional view of an example multibeam element 516 that comprises a plurality of diffraction gratings 518-521. FIG. 5D illustrates a plan view of an example multibeam element 524 that comprises a plurality of diffraction gratings 526-532. The cross sectional view in FIG. 5C may represents a cross-sectional view through four diffraction gratings 518-521 of the multibeam element 516. As illustrated in FIG. 5C, the plurality of diffraction gratings 518-521 of the multibeam element 516 are provided at the first surface 212 of the plate light guide 208 each diffraction grating has a different feature spacing d. Further, as illustrated, the first diffraction grating 518 is independent from and adjacent to the second diffraction grating 519 within the multibeam element 516. A size of the multibeam element 516 and 524 is denoted by s in both FIGS. 5C and 5D, while a boundary of the diffractive multibeam element 524 is illustrated in FIG. 5D using a dashed line.

According to some embodiments, a differential density of diffraction gratings within a multibeam element may be configured to control a relative intensity of the light diffractively coupled-out by respective different diffractive multibeam elements of the multibeam elements 516 and 524. In other words, the diffractive multibeam elements 516 and 524 may have different densities of diffraction gratings therein and the different densities (i.e., the differential density of the diffraction gratings) may be configured to control the relative intensity of the coupled-out light. In particular, a diffractive multibeam element 516 having fewer diffraction gratings within the diffraction grating plurality may produce coupled-out light having a lower intensity (or beam density) than another multibeam element having relatively more diffraction gratings. The differential density of diffraction gratings may be provided using locations such as locations 533 and 534 illustrated in FIG. 5D within the multibeam element 524 that lack or are without a diffraction grating, for example. The multibeam elements 516 and 524 may also be formed in the second surface 214 of the plate light guide 208 with a reflective material filling the grooves and covering the diffractive features to form reflection mode multibeam elements comprising a plurality of diffraction gratings, as described above with reference to FIG. 5B.

Figure 6A:
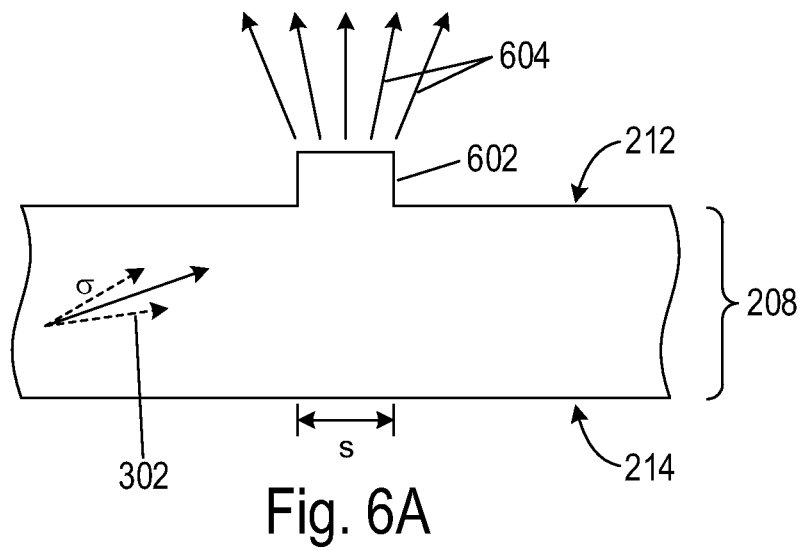
FIGS. 6A-6C illustrate cross-sectional views of examples of micro-structure multibeam elements.

According to other embodiments, the multibeam elements 218 may comprise micro-refractive elements. FIG. 6A illustrates a cross-sectional view of the plate light guide 208 in which a multibeam element 602 comprises a micro-refractive element. According to various embodiments, the micro-refractive multibeam element 602 is configured to refractively couple out a portion of the light 302 from the plate light guide 208 over different angles as coupled-out light 604. The micro-refractive multibeam element 602 may have any of various shapes including, but not limited to, a semi-spherical shape, a rectangular shape or a prismatic shape (i.e., a shape having sloped facets). According to various embodiments, the micro-refractive multibeam element 602 may extend or protrude out of the first surface 212 of the plate light guide 208, as illustrated, or may be a cavity or recess in the first surface 212 (not illustrated). In some embodiments, the micro-refractive multibeam element 602 may comprise the material as the plate light guide 208. In other embodiments, the micro-refractive multibeam element 602 may comprise another material adjacent to, and in some examples, in contact with the first surface 212.

Figure 6B:
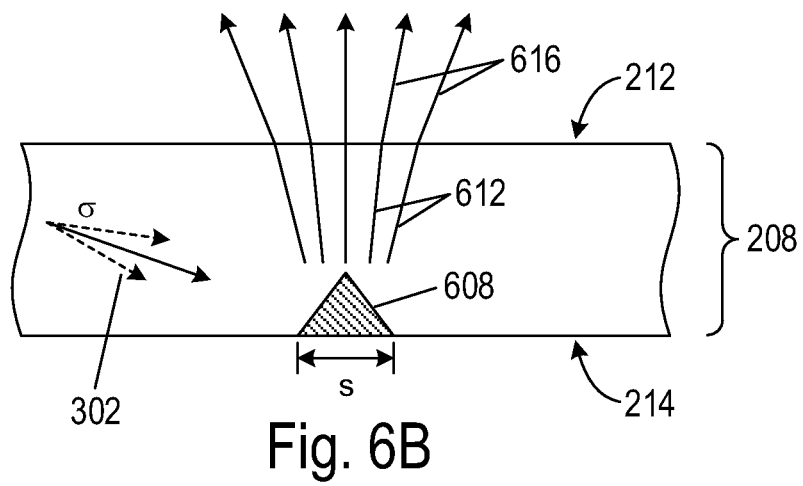
Figure 6C:
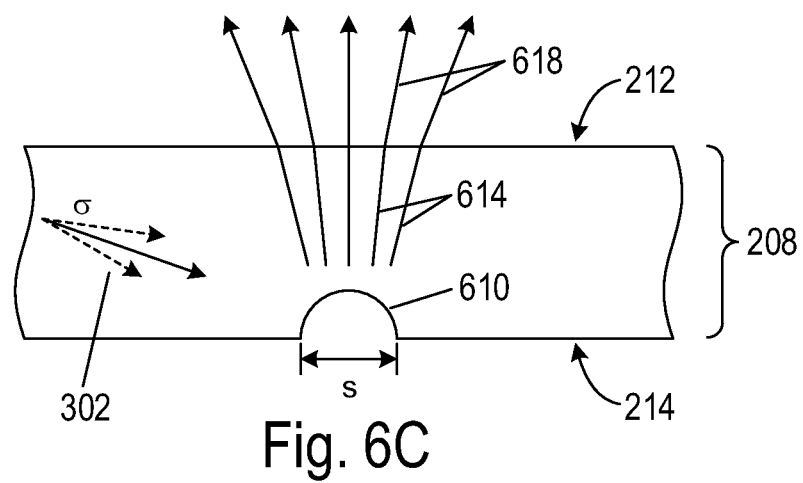

According to yet other embodiments, the multibeam elements 218 may comprise micro-reflective elements. FIG. 6B illustrates a cross-sectional view of the plate light guide 208 in which a multibeam element 608 comprises a prismatic-shaped micro-reflective element located along the second surface 214. FIG. 6C illustrates a cross-sectional view of the plate light guide 208 in which a multibeam element 610 comprises a semi-spherical micro-refractive element located along the second surface 214. The micro-reflective multibeam elements 608 and 610 may include, but are not limited to, a reflector that employs a reflective material or layer thereof (e.g., a reflective metal) or a reflector based on TIR. In other embodiments (not illustrated), the micro-reflective multibeam element may be located within the plate light guide 208 between the first and second surfaces 212 and 214.

In particular, FIG. 6B illustrates the prismatic-shaped micro-reflective multibeam element 608 configured with reflective facets that extend within the plate light guide 208. The facets of the prismatic micro-reflective multibeam element 608 are configured to reflect (i.e., reflectively couple) a portion of the light 612 out of the plate light guide 208. The facets may be slanted or tilted (i.e., have a tilt angle) relative to a propagation direction of the light 302 to reflect the light portion out of plate light guide 208. The facets may be formed using a reflective material within the plate light guide 208 (e.g., as illustrated in FIG. 6B) or may be surfaces of a prismatic cavity in the second surface 214, according to various embodiments. When a prismatic cavity is employed, either a refractive index change at the cavity surfaces may provide reflection (e.g., TIR) or the cavity surfaces that form the facets may be coated with a reflective material to provide reflection, for example. In FIG. 6C the illustrated semi-spherical micro-reflective element 610 having a substantially smooth, curved surface. The surface curvature of the semi-spherical micro-reflective multibeam element 610 reflects the portion of the light 302 depending on a point of incidence the light 302 makes with the curved surface. The semi-spherical micro-reflective multibeam element 610 in FIG. 6C may be either a reflective material that extends within the plate light guide 208 or a cavity (e.g., a semi-circular cavity) formed in the second surface 214, as illustrated in FIG. 6C. Note that, in FIGS. 6B and 6C, the principal angular directions of the reflected light 612 and 614 are generally refracted due to a change in refractive index as coupled-out light 616 and 618 emerges the first surface 212 into air (or a similar surrounding material).

As described above with reference to FIG. 2C, an array of multiview pixels may be formed from arrays of sets of light valves. The multibeam element associated with each set of light valves of a multiview pixel may be spatially offset toward a center of the multiview pixel.

Figure 7:
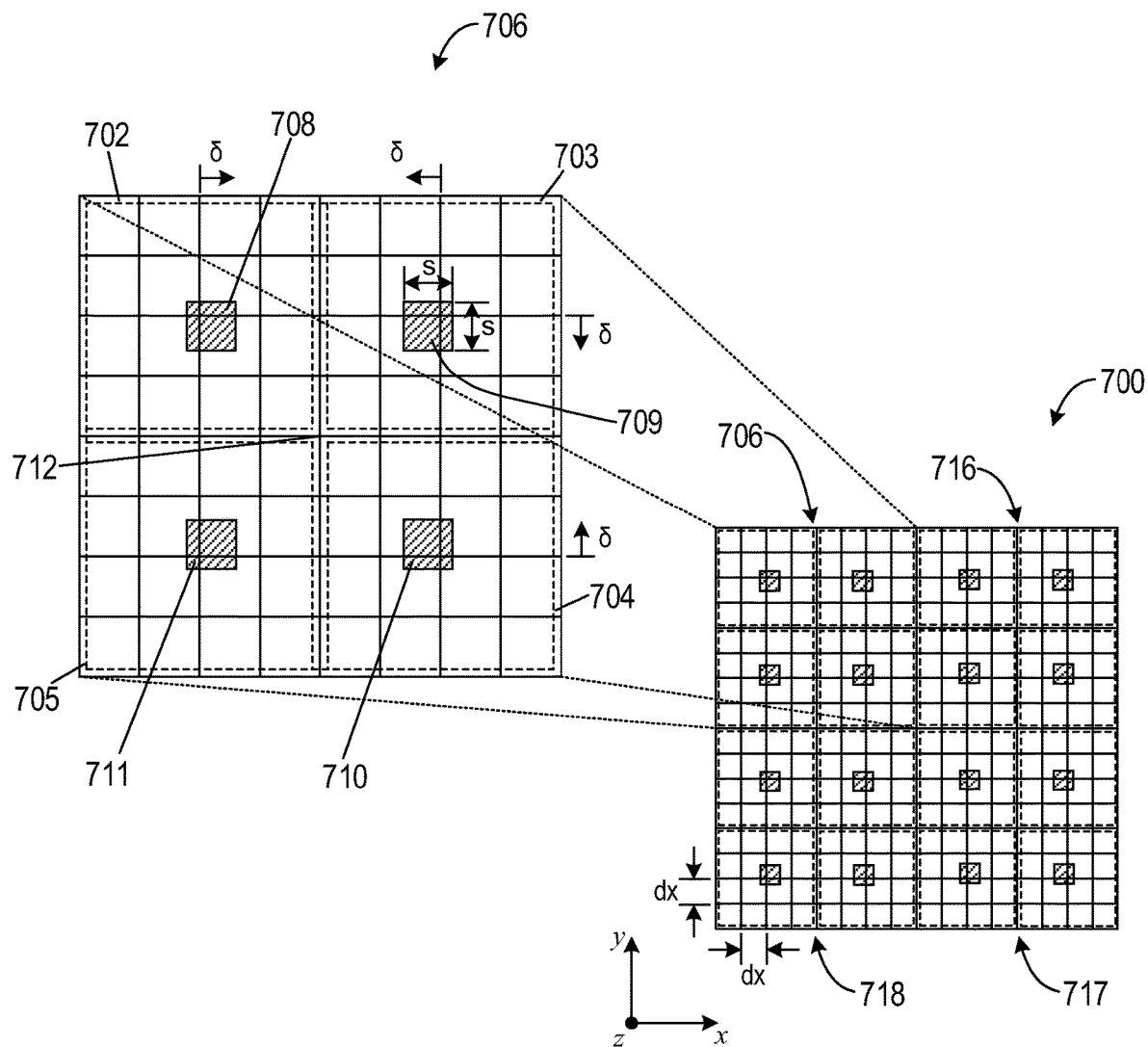
FIG. 7 illustrates a plan view of sets of light valves and corresponding spatially offset multibeam elements of a multiview display.

FIG. 7 illustrates a plan view of sixteen example sets of light valves and corresponding multibeam elements of a multiview display 700. As illustrated, each set of light valves in the multiview display 700 comprises a four-by-four array of light valves and is demarcated by a dashed-line square. For example, a set of light valves 702 comprises a four-by-four array of light valves. In FIG. 7, the sixteen example sets of light valves are grouped to form four multiview pixels, each multiview pixel comprising a two-by-two array of four sets of light valves. For example, four sets of light valves 702-705 are grouped to form a multiview pixel 706. FIG. 7 includes a magnified view of the multiview pixel 706 formed from the four sets of light valves 702-705. The magnified view of the multiview pixel 706 reveals that the four multibeam elements 708-711 associated with corresponding sets of light valves 702-705 are spatially offset toward a center 712 of the multiview pixel 706.

Figure 8A:
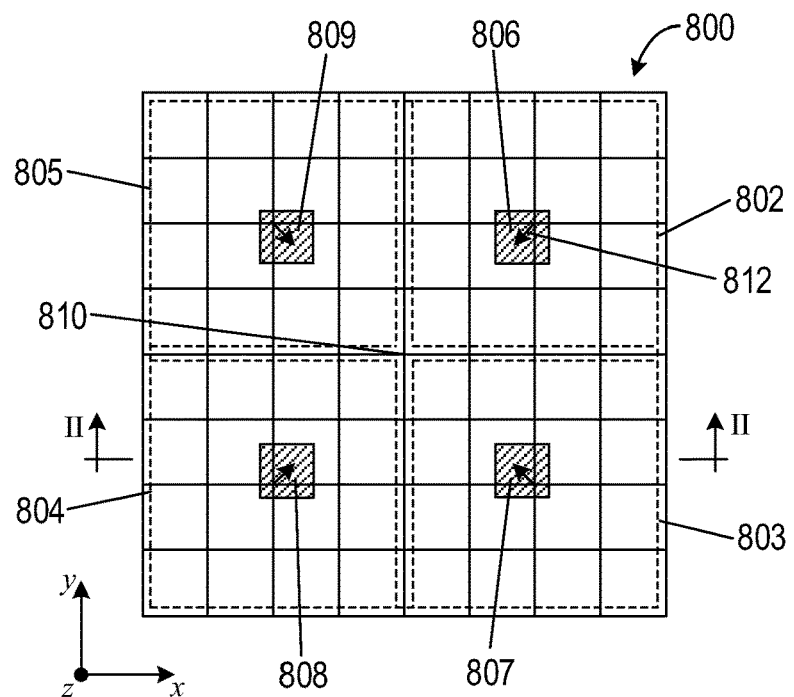
FIG. 8A illustrates a plan view of an example multiview pixel comprising four sets of light valves and corresponding spatially offset multibeam elements.

According to various embodiments (e.g., as illustrated in FIG. 7), a size of a multibeam element (e.g., illustrated multibeam elements 708-711) is comparable to the size of the light valves. The term 'size' may refer a length, width, or area. The size of a multibeam element may be given by the length, s, of a side of the multibeam element or by the area, s×s, of the multibeam element (In FIGS. 5-6, the size of the multibeam elements is denoted by s). In FIG. 7, the length of a light valve is denoted by dx, and the size of a light valve may be given by the length, dx, or by the area, e.g., dx×dx, of the light valve. By definition herein, a size of the multibeam element is 'comparable' in size to a light valve in that the multibeam element size is a function of both a size of the light valve (e.g., dx) and a number of sets of light valves in a multiview pixel. For example, for a p-by-p array of sets of light valves in a multiview pixel, the multibeam element size may be given by the light valve size dx divided by about one-half of p (i.e., p/2). As such, for a two-by-two (2×2) array of sets of light valves in a multiview pixel (e.g, as illustrated in FIGS. 7 and 8A), the size of the multibeam element may be between about twenty-five percent (25%) and about one hundred percent (100%) of the size of the light valve. In other words, according to some embodiments, the size of a multibeam element relative to the size dx of a light valve may satisfy the following condition:

$$\tfrac{1}{4} dx \le s \le dx \qquad (2)$$

In other examples, the multibeam element size is greater than about thirty percent (30%) of the light valve size, or about forty percent (40%) of the light valve size, or greater than about fifty percent (50%) of the light valve size, and the multibeam element is less than about one hundred percent (100%) of the light valve size, or less than about eighty percent (80%) of the light valve size, or less than about seventy percent (70%) of the light valve size, or less than about sixty percent (60%) of the light valve size, e.g., for an example two-by-two array. As such, by 'comparable size,' the multibeam element size may be between about seventy-five percent (75%) and about one hundred fifty (150%) of the light valve size divided by two for a two-by-two array of sets of light valves. In another example, a multibeam element may be comparable in size to a light valve where the multibeam element size is between about one hundred twenty-five percent (125%) and about eighty-five percent (85%) of the light valve size divided by one-half of a number p of sets of light valves in a p-by-p array of sets of light valves within a multiview pixel. According to some embodiments, the comparable sizes of a multibeam element and a light valve size may be chosen to reduce, or in some examples to minimize, dark zones between views of a multiview display, while at the same time reducing, or in some examples minimizing, an overlap between views of the multiview display.

In the example of FIG. 7, each multibeam element 708-711 is spatially offset toward the center of the multiview pixel in the x- and y-directions by a distance δ where the distance δ may be plus or minus the size or length dx of a light valve (e.g., −dx≤δ≤dx). For example, the spatial offset distance δ may be plus or minus about dx divided by two (dx/2) for a two-by-two array of sets of light valves, as illustrated in FIG. 7. The plan view of the multiview display 700 also reveals that the four multibeam elements that correspond to the four sets of light valves of three other multiview pixels 716-718 are also spatially offset toward the centers of the three multiview pixels 716-718. Each of the four-by-four sets of lights valves, such as sets of light valves 702-706, creates sixteen different views. As a result, each of the multiview pixels 706, 716-718 creates 64 views with a perceived resolution of approximately 4×dx. In other embodiments, the distance of the spatial offset of a multibeam element from the center of a corresponding set of light valves toward the center of multiview pixel may be in only one of the x- and y-directions. Note that FIG. 7 is not intended to provide a scale depiction of the relative sizes of the multibeam elements 708-711 and the light valves (e.g., light valves 716-718), but instead merely provides certain relational aspects of the various illustrated elements.

Figure 8B:
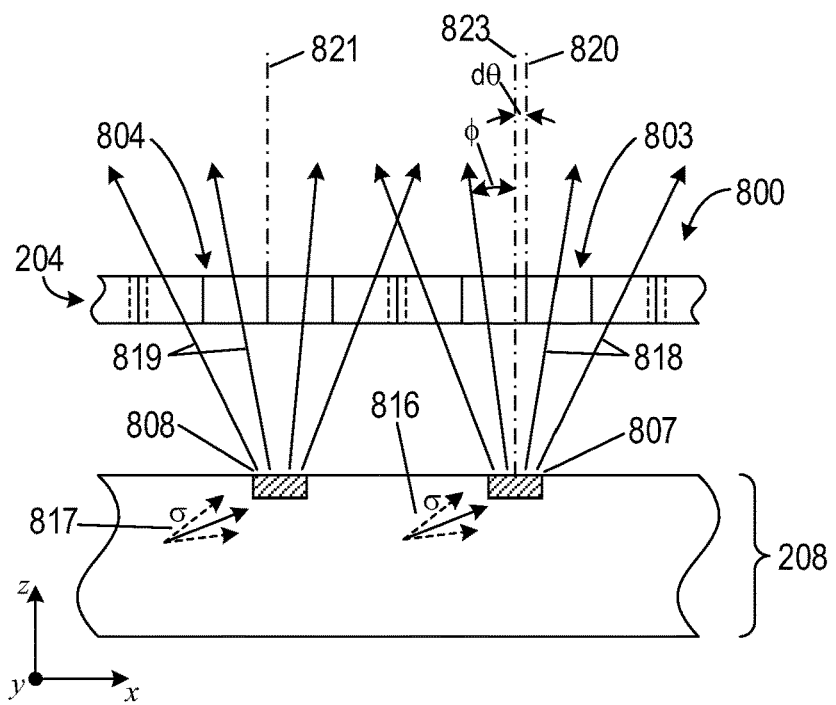
FIG. 8B illustrates a cross-sectional view of the multiview pixel illustrated in FIG. 8A along a line II-II.

The spatial offsets of the multibeam elements with respect to the corresponding sets of light valves of a multiview pixel are configured to provide coupled out light from the plate light guide an angular offset (or tilt) in addition to the different angles provide by the multibeam elements themselves. FIG. 8A illustrates a plan view of an example multiview pixel 800 comprising four sets of light valves 802-805 identified by dashed-line squares and four corresponding multibeam elements 806-809. FIG. 8B illustrates a cross-sectional view of the multiview pixel 800 along a line II-II illustrated in FIG. 8A. In FIG. 8A, the multibeam elements 806-809 are configured to couple out light from the plate light guide 208 with different angles. Further, the illustrated multibeam elements 806-809 are spatially offset toward a center 810 of the multiview pixel 800 as indicated by directional arrows 812. In FIG. 8B, light 302 propagating in the plate light guide 208 is incident on the multibeam elements 807 and 808 as represented by directional arrows 816 and 817. The multibeam elements 807 and 808 are configured to couple out light with different angles as described above with reference to FIGS. 5A-5D and 6A-6C. Note that FIG. 8 is not intended to provide a scale depiction of the relative sizes of the multibeam elements 806-809 and the light valves (e.g., light valves 716-718), but instead merely provides certain relational aspects of various the illustrated elements.

In FIG. 8B, directional arrows 818 represent paths of coupled out light from the multibeam element 807. The coupled-out light having paths represent by directional arrows 818 passes through light valves of the set of light valves 803. Further in FIG. 8B, directional arrows 819 represent paths of coupled out light from the multibeam element 808. The coupled-out light having paths represented by directional arrows 819 passes through light valves of the set of light valves 804, as illustrated. The spatial offset of the multibeam elements (or equivalently of the virtual light sources) creates an angular offset, dθ, with respect to a normal direction of the coupled-out light to the screen 204 located at the center of each set of light valves. In general, the angular offset, dθ, applies substantially equally to all of the light beams of the coupled-out light associated with a particular set of light valves. For example, in FIG. 8B, dot-dashed lines 820 and 821 represent normal directions to the screen 204 at the centers of the sets of light valves 803 and 804, respectively. Dot-dashed line 823 represents a normal direction to a center of the multibeam element 807. Light coupled out by the multibeam element 807 with different angles is represented by φ with respect to the normal direction 823 and includes the angular offset dθ with respect to the normal direction 820 of the set of light valves 803. In certain embodiments in which the multibeam elements 807 and 808 are configured as diffraction gratings described above with reference to FIGS. 5A-5D, the different angles are the diffraction angles (i.e., $\phi = \theta_m$).

As illustrated in FIG. 8B, the light coupled out from a multiview element passes through light valves of a corresponding set of light valves. Modulated light beams that emerge from sets of light valves of a multiview pixel interleave at distances beyond the screen 204. The light valves of the sets of light valves may be modulated to create different views of a multiview image described above with reference to FIG. 1A and described below with reference to FIGS. 9-12.

FIGS. 9-12 illustrate projecting different views of a multiview image using sets of light valves of a multiview pixel. FIG. 9A illustrates the letter "R" as an example of a three-dimensional (3D) object to be projected in different views of a multiview image. The letter R lies in the xy-plane and protrudes in the z-direction. Directional arrows labeled 1-8 represent eight different view directions of the 3D letter R along a curve 902 that lies in the xz-plane. FIG. 9B illustrates a series of eight different two-dimensional (2D) images of the 3D letter "R" labeled 1-8. Each 2D image displays one of the eight different views of the letter R illustrated in FIG. 9A. The images 1-8 of FIG. 9B represent discrete views an observer would see of the letter R as the observer's eye 904 looks at the 3D letter R in the corresponding view directions along the curve 902. In other words, the images 1-8 form a multiview image of the 2D letter R along the curve 902. For example, 2D image 3 of FIG. 9B displays a view of the letter R in the view direction 3 of FIG. 9A. The series of images 1-8 are consecutive or arranged in spatial succession that corresponds to the view directions 1-8 of FIG. 9A. For example, a change in an observer's attention from image 3 to either image 2 or 4 in FIG. 9B is equivalent to a change in view direction 3 to either view direction 2 or 4 in FIG. 9A.

Figure 9B:
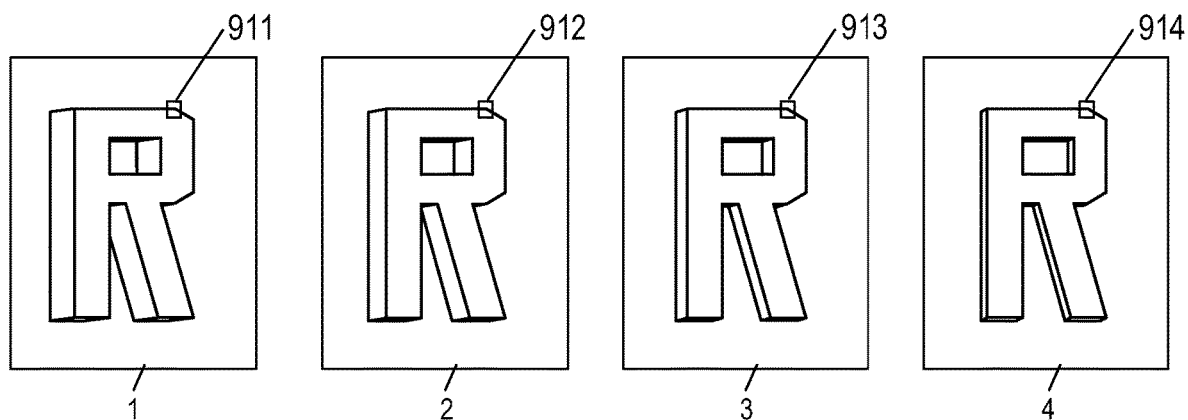
FIG. 9B illustrates a series of two-dimensional (2D) images of the 3D letter "R" illustrated in FIG. 9A.
Figure 9B:
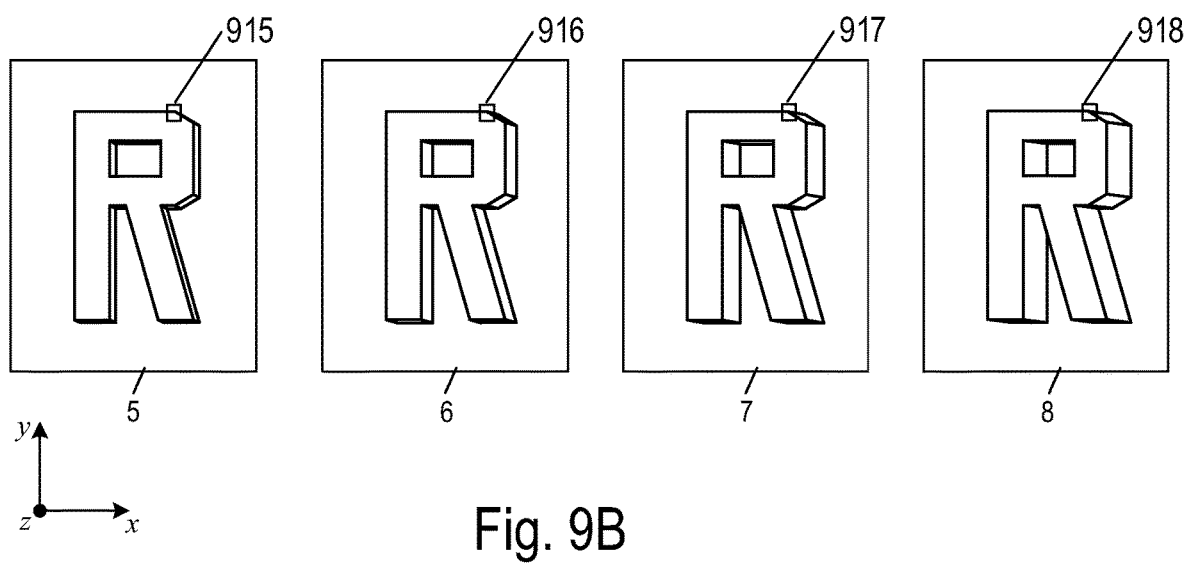
Figure 10:
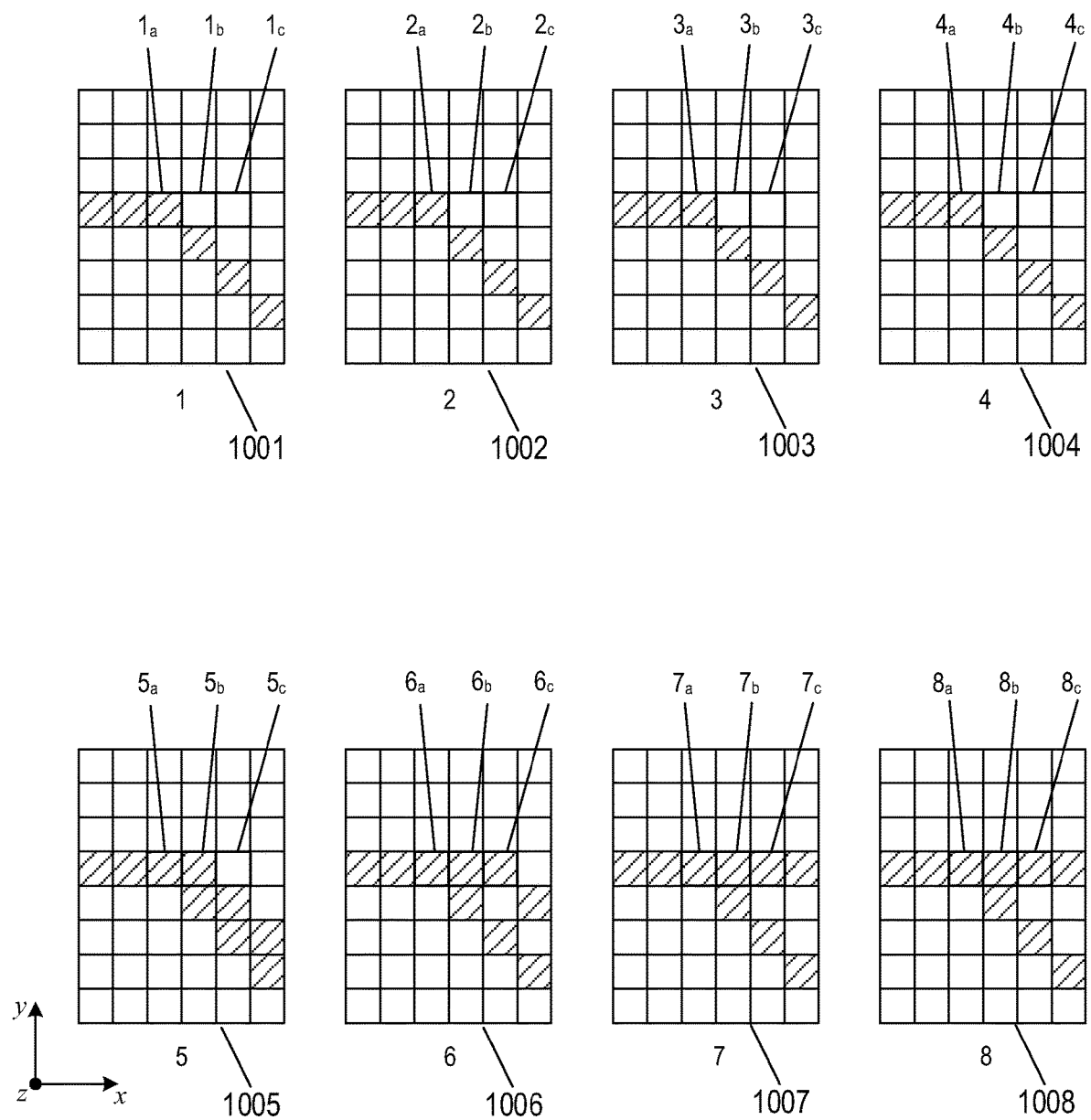
FIG. 10 illustrates magnified views of example sets of pixels that correspond to regions of eight different 2D images in FIG. 9B.

Each of the 2D images illustrated in FIG. 9B comprises a set of pixels. Each pixel has an intensity and a corresponding address or coordinate location in an image (e.g., a pixel equals (x, y, pixel intensity)). FIG. 10 illustrates magnified views of eight example sets of pixels 1001-1008 that correspond to regions 911-918 of the images 1-8 of FIG. 9B. For example, the set of pixels 1001 of FIG. 10 is a magnified view of the pixels in the region 911 of image 1 in FIG. 9B. In FIG. 10, the sets of pixels 1001-1008 have the same addresses or coordinate locations in the corresponding images 1-8 of FIG. 9B. For example, a triplet of adjacent pixels labeled 1a, 1b, and 1c in the set of pixels 1001 have the same coordinates (x, y) as the triplet of adjacent pixels labeled 5a, 5b, and 5c in the set of pixels 1005. For the sake of simplicity, in the example of FIG. 10, the intensities of the pixels are binary (i.e., black and white) with hash-marked pixels corresponding to the edges of the letter R in regions 911-918 of FIG. 9B. In other embodiments, pixels may be color pixels, such as red, green, and blue, and intensities may be modulated to control the amount light emitted from each pixel.

Figure 11:
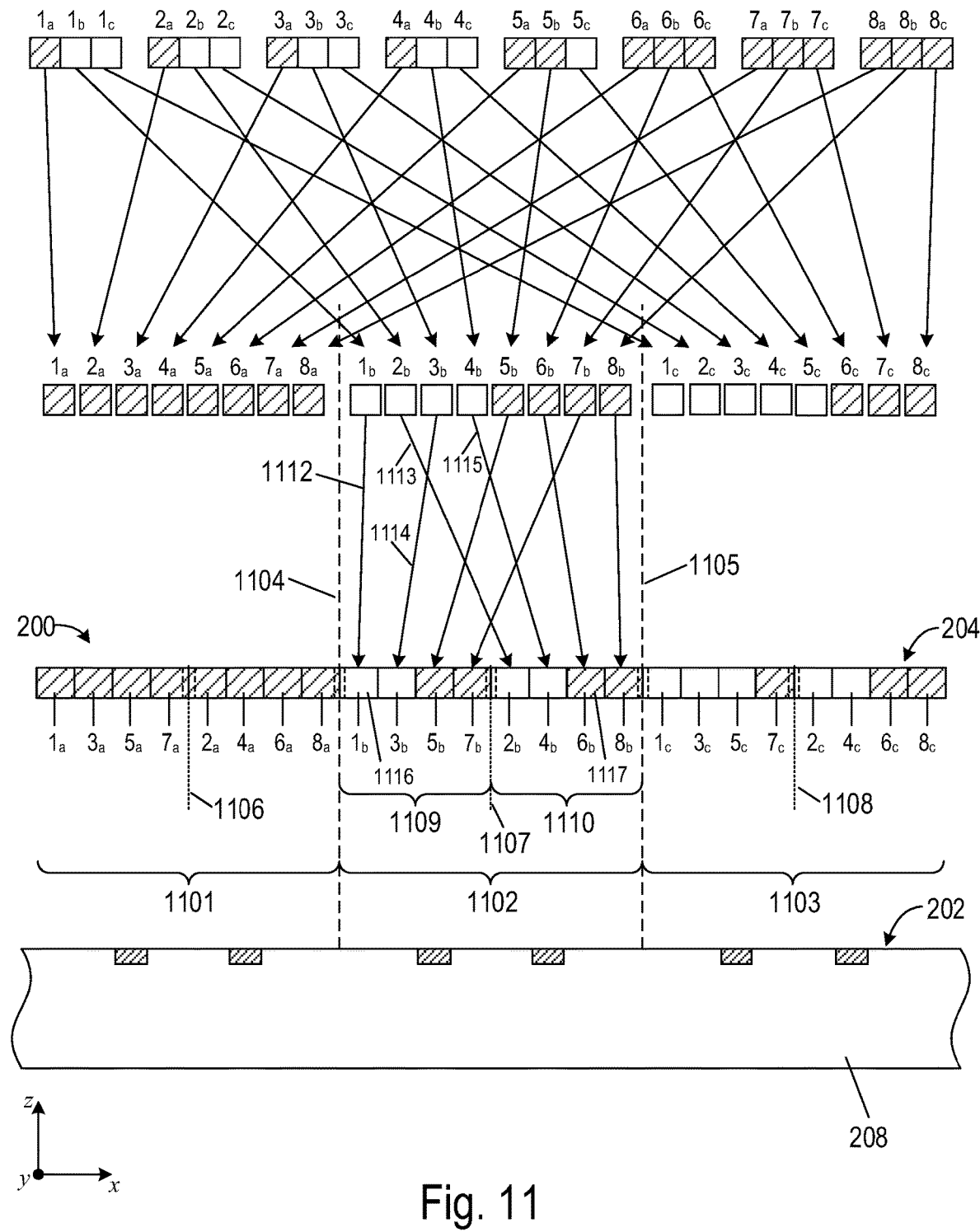
FIG. 11 illustrates a cross-sectional view of three adjacent multiview pixels of a multiview display.

FIG. 11 illustrates a cross-sectional view of three adjacent multiview pixels 1101-1103 of the multiview display 200 described above and assignment of pixel intensities of the 2D images to light valves of multiview pixels. Dashed lines 1104 and 1105 represent boundaries between the multiview pixels 1101-1103. Dotted lines 1106-1108 represent boundaries between sets of light valves that comprise the multiview pixels 1101-1103. For example, the multiview pixel 1101 comprises a set of light valves 1109 and a set of light valves 1110. FIG. 11 illustrates assignment of pixel intensities of triplets of adjacent pixels illustrated in FIG. 10 to a row of light valves of the sets of light valves of the multiview pixels 1101-1103. As illustrated in FIG. 11, pixels of the triplets of adjacent pixels with the same coordinates in the images 1-8 are assigned to the same multiview pixel image. For example, in FIG. 11, the pixels 1a, 2a, 3a, 4a, 5a, 6a, 7a, and 8a have the same coordinates in the images 1-8 of FIG. 10 and are assigned to the multiview pixel 1101. The pixels 1b, 2b, 3b, 4b, 5b, 6b, 7b, and 8b have the same coordinates in the images 1-8 and are assigned to the multiview pixel 1102. The pixels 1c, 2c, 3c, 4c, 5c, 6c, 7c, and 8c have the same coordinates in the images 1-8 and are assigned to the multiview pixel 1103. The intensity of pixels with the same coordinates in consecutive images are assigned in alternating order to the light valves of the sets of light valve of the multiview pixel. Directional arrows, such as directional arrows 1112-1115, represent an alternating order in which the intensities of the pixels assigned to the multiview pixel 1102 are assigned to the light valves of the two sets of light valves 1109 and 1110. For example, directional arrow 1112 represents assignment of the pixel intensity of the pixel 1b in image 1 to a first pixel in the set of light valves 1109. Directional arrow 1113 represents assignment of the pixel intensity the pixel 2b in image 2 (adjacent to image 1) to a first pixel in the set of light valves 1110. Directional arrow 1114 represents assignment of the pixel intensity of the pixel 3b in image 1 to a second pixel in the set of light valves 1109. Directional arrow 1115 represents assignment of the pixel intensity of the pixel 4b in image 2 to a second pixel in the set of light valves 1110. The intensity of a pixel in the images 1-8 may be assigned to a light valve of a set of light valves by modulating the intensity of the light valve to substantially match the intensity of the pixel. For example, the light valves 1116 and 1117 of the sets of light valves 1109 and 1110 are modulated to substantially match the intensity of the pixels 1b and 6b, respectively.

Light coupled out of a multibeam element of the plate light guide propagates to a corresponding set of light valves. Light that is transmitted through a modulated light valve of a set of light valves creates a modulated light beam that propagates away from the screen 204 of the multiview display 200. Certain modulated light beams created by sets of light valves of a multiview pixel as described above with reference to FIG. 11 interleave away from the screen 204 thereby creating the directional pixels of images in a multiview image.

Figure 12:
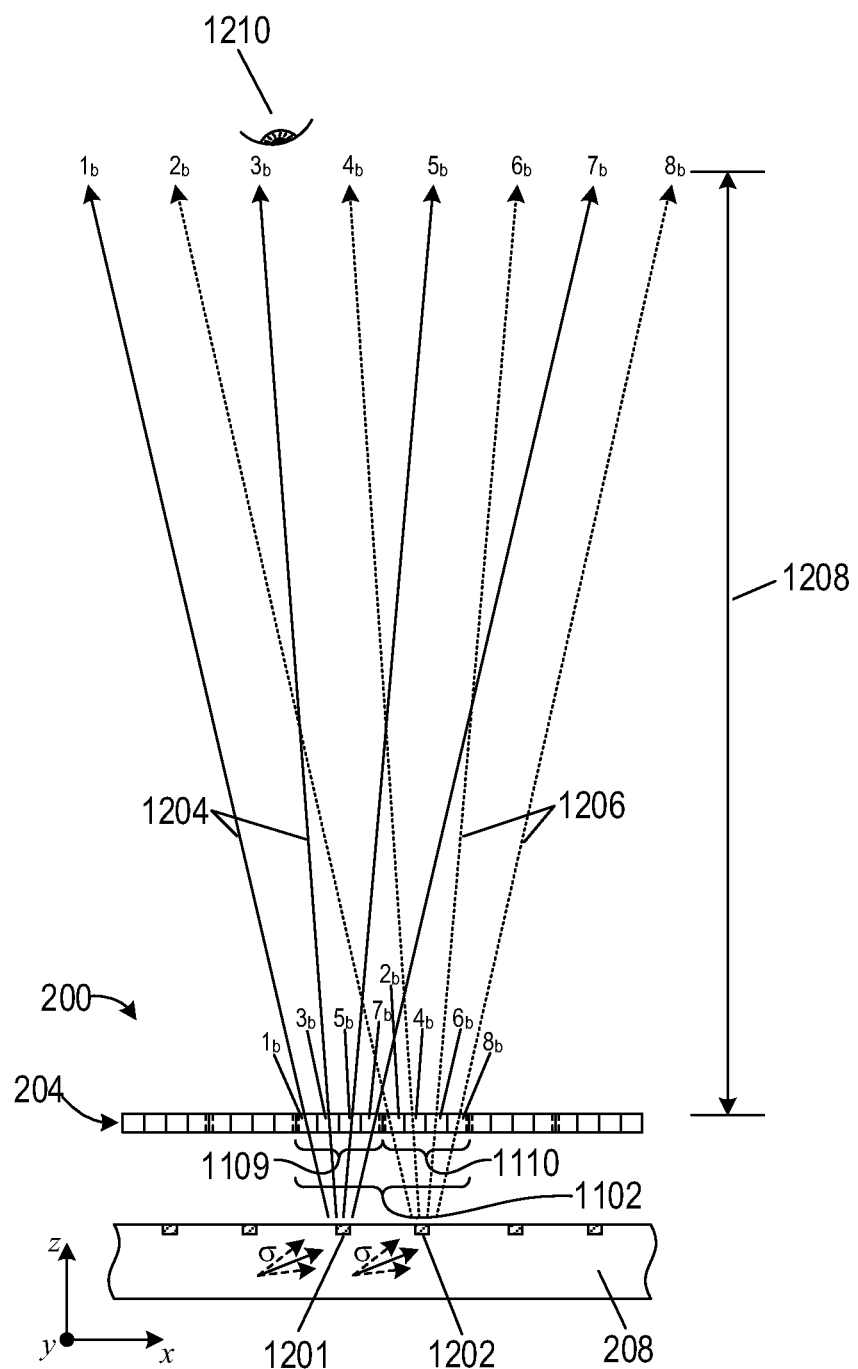
FIG. 12 illustrates directional pixels emanating from light valves of sets of light valves of a multiview pixel of a multiview display.

FIG. 12 illustrates directional pixels emanating from the light valves of the sets of light valves 1109 and 1110 of the multiview pixel 1102, e.g., of FIG. 11. Multibeam elements 1201 and 1202 couple out light from corresponding sets of light valves 1109 and 1110, e.g., as described above with reference to FIGS. 8A-8B. Solid-line directional arrows 1204 represent couple out light that emerges as modulated light beams from the light valves of the set of light valves 1109 described above with reference to FIG. 11. Dashed-line directional arrows 1206 represent couple out light that emerges as modulated light beams from the light valves of the set of light valves 1110 described above with reference to FIG. 11. As illustrated in FIG. 12, directional pixels that correspond to the pixels 2b, 3b, 4b, 5b, 6b, and 7b interleave within a viewing distance 1208. The modulated light beams that correspond to pixels 1b and 8b may not interleave with the other modulated light beams output from the sets of light valves 1109 and 1110 within the view distance 1208. In other words, the modulated light beams that correspond to pixels of the first and last images in the series of images 1-8 may not interleave with the modulated light beams that correspond to the pixels of images in the series of images 2-7 within the viewing distance 1208. The interleaving of the modulated light beams output from the sets of light valves 1109 and 1110 reorders the pixels to match the order of the images 1-8 at about the viewing distance 1208. As an observer's eye 1210 moves across the screen 204 in the x-direction, the light from the modulated light beams enters the observer's eye with the same order as the series of images 1-8. When the other multiview pixels are operated in the same manner, the observer sees the images 1-8 in consecutive order as the observer's eyes moves across the screen 204 from the viewing distance 1208, recreating the multiview image experience described above with reference to FIG. 1A.

Figure 13:
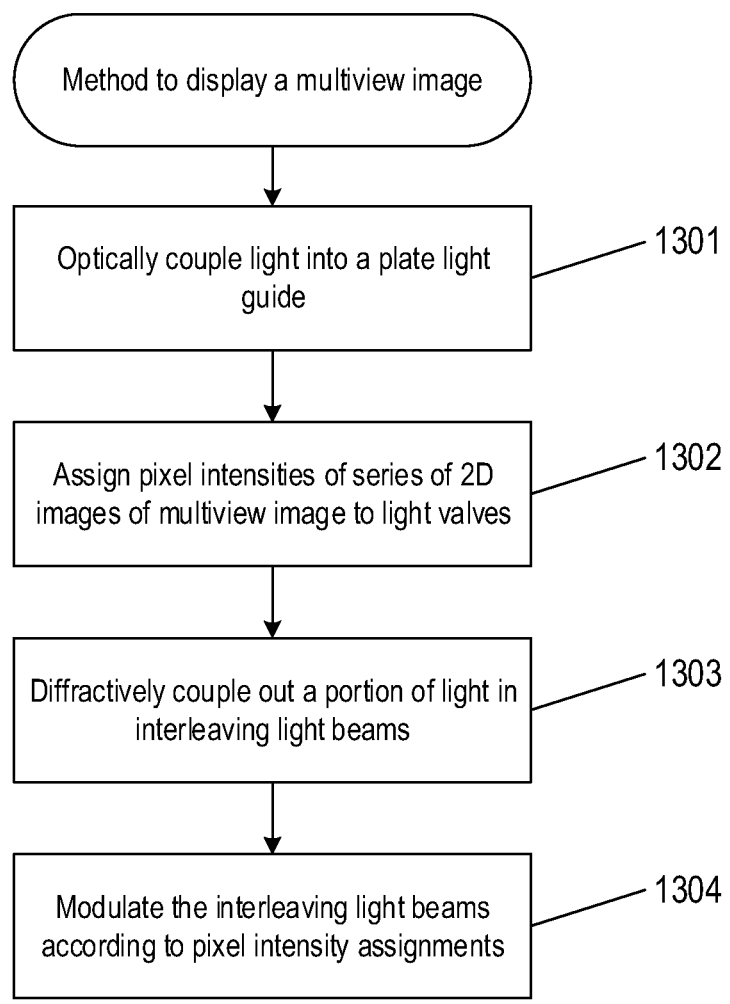
FIG. 13 illustrates a flow diagram of a method to display a multiview image.

FIG. 13 illustrates a flow diagram of a method to display a multiview image. In block 1301, light generated by a light source optically coupled to a plate light guide is optically coupled into the plate light guide as described above with reference to FIGS. 2 and 3. In block 1302, pixel intensities of a series of two-dimensional (2D) images of a multiview image are assigned to light valves of a plurality of sets of light valves of a multiview pixel as described above with reference to FIGS. 10 and 11. In block 1303, a portion of the light propagating in the plate light guide is couple out from a plurality of multibeam elements of the plate light guide as described above with reference to FIG. 6. The modulated light beams have different angles and angular offsets in order to interleave the modulated light beams as described above with reference to FIGS. 8 and 12. In block 1304, the coupled-out light is modulated at light valves of the plurality of sets of light valves of the multiview pixel according to assigned pixel intensities as described above with reference to FIG. 12. The interleaved and modulated light beams are directional pixels that correspond to different views of the multiview image.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments illustrated herein but is to be accorded the widest scope consistent with the principles and novel features disclosed herein.

What is claimed is:

1. A multiview display comprising:
   a multiview pixel having a plurality of sets of light valves; and
   a backlight comprising a plate light guide configured to guide light as guided light and a plurality of multibeam elements configured to couple out a portion of the guided light as coupled-out light having different angles, each multibeam element of the plurality of multibeam elements corresponding to a different set of light valves of the multiview pixel and each multibeam element having a spatial offset with respect to a center of the set of light valves toward a center of the multiview pixel,
   wherein a size of the multibeam element is comparable to a size of a light valve in the sets of light valves of the multiview pixel, and wherein an angular offset of the coupled-out light is provided by the spatial offset of each multibeam pixel, the sets of light valves being configured to provide modulated light beams that interleave to produce directional views of a multiview image within a viewing distance of the multiview display as a result of the angular offset of the coupled-out light.

2. The multiview display of claim 1, wherein a multibeam element of the plurality of multibeam elements comprises a diffraction grating at a surface of the plate light guide, the diffraction grating being configured to diffractively couple out the portion of the guided light as the coupled-out light having different diffraction angles.

3. The multiview display of claim 2, wherein the diffraction grating comprises a linearly chirped diffraction grating.

4. The multiview display of claim 2, wherein the diffraction grating comprises a plurality of diffraction gratings.

5. The multiview display of claim 1, wherein a multibeam element of the plurality of multibeam elements comprises one or both of a micro-reflective element and a micro-refractive element, the micro-reflective element being configured to reflectively couple out the portion of the guided light as the coupled-out light, and the micro-refractive element being configured to refractively couple out the portion of the guided light as the coupled-out light.

6. The multiview display of claim 1, wherein the size of the multibeam element is between twenty-five percent and one hundred percent of the size of a light valve of the sets of light valves.

7. The multiview display of claim 1, wherein a shape of the multibeam element is analogous to a shape of the multiview pixel.

8. The multiview display of claim 1, wherein the multibeam element is located one of at a first surface and at a second surface of the plate light guide, the multibeam element being configured to couple out the guided light portion through the first surface.

9. The multiview display of claim 1, further comprising a light source optically coupled to an input of the plate light guide, the light source being configured to provide the guided light one or both of having a non-zero propagation angle and being collimated according to a predetermined collimation factor.

10. The multiview display of claim 1, wherein the spatial offset with respect to the center of the set of light valves comprises a distance equal to a fraction of the size of the light valve.

11. A multiview display comprising:
    a screen having a plurality of multiview pixels, each multiview pixel having a plurality of sets of light valves; and
    a backlight having a plurality of multibeam elements, each multibeam element corresponding to a set of light valves and having a spatially offset with respect to a center of the corresponding set of light valves toward a center of the multiview pixel, a size of the multibeam element being comparable to a size of a light valve of the sets of light valves in the multiview pixel,
    wherein the plurality of multibeam elements are configured to couple out light from the backlight as coupled-out light having different angles, and wherein the spatial offsets of the multibeam elements are configured to provide angular offsets of the coupled-out light such that the sets of light valves provide modulated light beams that interleave as directional views of a multiview image within a viewing distance of the multiview display.

12. The multiview display of claim 11, wherein the backlight comprises:
    a plate light guide configured to guide light as guided light, the plurality of multibeam elements being located at a surface of the plate light guide; and
    a light source coupled to an edge of the plate light guide, the light source to generate light coupled into the plate light guide as the guided light,
    wherein a portion of the coupled-in light is coupled out of the plate light guide by the multibeam elements as the coupled-out light.

13. The multiview display of claim 12, wherein the backlight further comprises a light source optically coupled to an input of the plate light guide, the light source being configured to provide the guided light one or both of having a non-zero propagation angle and being collimated according to a predetermined collimation factor.

14. The multiview display of claim 11, wherein a multibeam element of the plurality of multibeam elements comprises a diffraction grating configured to diffractively couple out the light from the backlight as the coupled-out light.

15. The multiview display of claim 14, wherein the diffraction grating comprises a plurality of diffraction gratings.

16. The multiview display of claim 11, wherein a multibeam element of the plurality of multibeam elements comprises one or both of a micro-reflective element and a micro-refractive element, the micro-reflective element being configured to reflectively couple out the light from the backlight as the coupled-out light, and the micro-refractive element being configured to refractively couple out the light from the backlight as the coupled-out light.

17. The multiview display of claim 11, wherein the spatial offset of the multibeam element with respect to the center of the set of light valves comprises a distance equal to a fraction of the size of a light valve of the sets of light valves.

18. A method to display a multiview image, the method comprising:
    optically coupling light generated by a light source into a plate light guide;
    assigning pixel intensities of a series of two-dimensional (2D) images of the multiview image to light valves of a plurality of sets of light valves of a multiview pixel;
    coupling out a portion of the light from a plurality of multibeam elements of the plate light guide, each multibeam element corresponding to a set of light valves and having a spatial offset with respect to a center of the set of light valves toward a center of a multiview pixel; and
    modulating the coupled-out light portion using light valves of the plurality of sets of light valves of the multiview pixel according to the assigned pixel intensities,
    wherein modulated light beams emerging from the light valves interleave according to spatial offsets of the multibeam elements to produce directional views of the multiview image at a viewing distance from sets of light valves, and wherein a size of a multibeam element is comparable to a size of a light valve of the plurality of set of light valves.

19. The method of claim 18, wherein assigning pixel intensities of the series of 2D images of the multiview image comprises:
    assigning pixels of the 2D images with a same pixel coordinate to the multiview pixel; and
    assigning pixel intensities of the pixels with the same pixel coordinates in consecutive 2D images in alternating order to light valves of the plurality of sets of light valves of the multiview pixel.

20. The method of claim 18, wherein each 2D image of the series of 2D images is of a different view of one or more three-dimensional (3D) objects or a 3D scene.

* * * * *